(12) United States Patent
Jenkins et al.

(10) Patent No.: US 11,879,723 B2
(45) Date of Patent: Jan. 23, 2024

(54) THICKNESS MEASURING SYSTEM AND METHOD

(71) Applicant: Michael Jenkins, Naperville, IL (US)

(72) Inventors: Michael Jenkins, Naperville, IL (US); Peter Neumann, Chicago, IL (US)

(73) Assignee: Jenbit LLC, Naperville, IL (US)

( * ) Notice: Subject to any disclaimer, the term of this patent is extended or adjusted under 35 U.S.C. 154(b) by 782 days.

(21) Appl. No.: 16/964,184

(22) PCT Filed: Jun. 23, 2020

(86) PCT No.: PCT/US2020/039185
§ 371 (c)(1),
(2) Date: Jul. 22, 2020

(87) PCT Pub. No.: WO2020/263857
PCT Pub. Date: Dec. 30, 2020

(65) Prior Publication Data
US 2022/0290985 A1 Sep. 15, 2022

Related U.S. Application Data

(60) Provisional application No. 62/865,903, filed on Jun. 24, 2019.

(51) Int. Cl.
*G01B 17/02* (2006.01)
*G01B 7/06* (2006.01)
(Continued)

(52) U.S. Cl.
CPC ............... *G01B 17/02* (2013.01); *G01B 7/06* (2013.01); *G01N 29/07* (2013.01); *G01N 29/226* (2013.01);
(Continued)

(58) Field of Classification Search
CPC ...... G01B 17/02; G01B 7/06; G01B 2210/58; G01B 5/0014; G01N 29/07; G01N 29/226;
(Continued)

(56) References Cited

U.S. PATENT DOCUMENTS 4,562,723 A * 1/1986 Hubner .............. G01N 33/0062
340/633
5,640,090 A * 6/1997 Furuya ..................... G01L 1/18
73/862.473

(Continued)

OTHER PUBLICATIONS

International Search Report and Written Opinion corresponding to International Patent Application No. PCT/US2020/039185, dated Sep. 25, 2020 (10 pages).

*Primary Examiner* — Tarun Sinha
(74) *Attorney, Agent, or Firm* — Maginot, Moore & Beck LLP

(57) ABSTRACT

A system and method measures the thickness of wear liners coupled to wear substrates of industrial equipment. The system includes at least one ultrasonic transducer wear sensor device coupled intermediate the wear liner and wear substrate and a data acquisition device configured to receive thickness data from the wear sensor device. The ultrasonic transducer wear sensor device is battery powered in one embodiment and passivated in an additional embodiment and powered through an interrogation signal.

19 Claims, 6 Drawing Sheets

(51) Int. Cl.
*G01N 29/07* (2006.01)
*G01N 29/22* (2006.01)
*G01N 29/24* (2006.01)
*G01N 29/32* (2006.01)

(52) U.S. Cl.
CPC ....... *G01N 29/2437* (2013.01); *G01N 29/326* (2013.01); *G01B 2210/58* (2013.01); *G01N 2291/02854* (2013.01)

(58) Field of Classification Search
CPC ............. G01N 29/2437; G01N 29/326; G01N 2291/02854; G01N 2291/106; G01N 29/28; G01N 2291/0258
See application file for complete search history.

(56) References Cited

U.S. PATENT DOCUMENTS

| | | |
|---|---|---|
| 2011/0088463 A1* | 4/2011 | Shapiro ................. A61B 5/224 73/172 |
| 2011/0265569 A1* | 11/2011 | Ganji ..................... F16C 19/52 73/587 |
| 2014/0366650 A1 | 12/2014 | Thillainadarajah et al. |
| 2015/0330206 A1 | 11/2015 | Trillon et al. |
| 2016/0274584 A1 | 9/2016 | Simpson et al. |
| 2016/0298691 A1 | 10/2016 | Dowie et al. |
| 2016/0305500 A1 | 10/2016 | Eden |
| 2016/0376771 A1 | 12/2016 | Behmlander et al. |
| 2017/0008623 A1 | 1/2017 | Lee et al. |
| 2018/0319444 A1* | 11/2018 | Hawkins ................ B62D 55/08 |
| 2018/0319641 A1* | 11/2018 | Eftestøl ................ B66F 17/003 |

\* cited by examiner

THICKNESS MEASURING SYSTEM AND METHOD

This application claims the benefit of U.S. Provisional Patent Application Ser. No. 62/865,903, filed Jun. 24, 2019.

BACKGROUND OF THE INVENTION

The present invention generally relates to the field of industrial equipment maintenance and repair. More particularly, the invention relates to devices, systems, and methods for measuring wear liner thickness.

Industrial equipment including but not limited to holding tanks and chutes are subject to tremendous amount wear damage over the lifetime of the equipment. For example, in mining operations, wear damage occurs as rock and sediment are conveyed through a chute into a holding tank. The rock and sediment make direct and shear/frictional impacts upon the wear surfaces of the mining equipment. In order to protect and reinforce the wear surfaces of the equipment, wear liners or wear plates are typically installed onto the wear surfaces. The wear liners or wear plates may be welded to the original cast equipment, or may be removably secured by bolts or similar fasteners.

Wear liners and wear plates have a finite life and must be replaced before wearing too thin and damaging the equipment itself. Because of this, it is necessary to establish proper maintenance of the equipment to maintain accurate measurements of the wear liner or wear plate thickness. The thickness measurements help guide when to replace the wear liners to prevent damage or destruction of the supporting structure of a holding tank, conveying and transferring chutes and components thereof. Defective or worn wear liners can cause production down time, lost productivity and potential safety hazards.

Thickness measurements are currently acquired through manual activity on the external wear plate surface. These measurements are typically taken using a handheld ultrasonic transducer device. Sound energy can be generated over a broad frequency spectrum. Audible sound occurs in a relatively low frequency range with an upper limit around twenty thousand cycles per second (20 KHz). The higher the frequency, the higher the pitch we perceive. Ultrasound is sound energy at higher frequencies, beyond the limit of human hearing. Most ultrasonic testing is performed in the frequency range between 500 KHz and 20 MHz, although some specialized instruments go down to 50 KHz or lower and some as high as 100 MHz. Whatever the frequency, sound energy consists of a pattern of organized mechanical vibrations traveling through a medium such as air or steel according to the basic laws of wave physics.

Ultrasonic thickness gauges work by very precisely measuring how long it takes for a sound pulse that has been generated by a small probe called an ultrasonic transducer to travel through a test piece and reflect back from the inside surface or far wall. Because sound waves reflect from boundaries between dissimilar materials, this measurement is normally made from one side in a "pulse/echo" mode.

The transducer contains a piezoelectric element which is excited by a short electrical impulse to generate a burst of ultrasonic waves. The sound waves are coupled into the test material and travels through it until they encounter a back wall or other boundary. The reflections then travel back to the transducer, which converts the sound energy back into electrical energy. In essence, the gauge listens for the echo from the opposite side. Typically, this time interval is only a few microseconds. The gauge is programmed with the speed of sound in the test material, from which it can then calculate thickness using the simple mathematical relationship:

$$T=(V)\times(t/2)$$

where
T=the thickness of the part
V=the velocity of sound in the test material
t=the measured round-trip transit time It is important to note that the velocity of sound in the test material is an essential part of this calculation. Different materials transmit sound waves at different velocities, generally having faster velocities in hard materials and slower velocities in soft materials, and sound velocity can change significantly with temperature. Thus, it is always necessary to calibrate an ultrasonic thickness gage to the speed of sound in the material being measured, and accuracy is reliant on this calibration.

Sound waves in the megahertz range do not travel efficiently through air, so a drop of coupling liquid is used between the transducer and the test piece in order to achieve good sound transmission. Common coupling fluid materials are glycerin, propylene glycol, water, oil, and gel. Only a small amount is needed, just enough to fill the extremely thin air gap that would otherwise exist between the transducer and the target. The coupling fluid must remain effective for the expected life of the sensor, i.e., when the wear plate wears out and needs replacing.

These manual measurements made through current ultrasonic transducer devices are time consuming, labor intensive, may require special equipment and permits due to the wear liner being in a confined space or abnormal height. The present invention attempts to overcome these shortcomings of the prior art by providing devices, systems, and methods to automate and simplify the wear liner/plate thickness measurements.

SUMMARY OF THE INVENTION

Provided herein are devices, systems and methods for measuring the condition of a wall that may be used, by way of example, to measure the thickness and/or temperature of a wear plate or wear liner. An advantage of at least some of the embodiments described herein is that the system allows for thickness measurements of wear plates to be taken and communicated without requiring additional human labor and resources or placing humans in danger.

In a first embodiment, the system comprises at least one thickness sensor device coupled to the non-wear side of a wear plate, the at least one thickness sensor device communicatively or electrically coupled to a power source and the at least one thickness sensor device communicatively coupled to a data acquisition device.

In a second embodiment, a method of measuring the thickness of a wear liner may include the steps of coupling at least one sensor device to a wear-liner and physically coupling a housing to a non-wear side of a wear liner. The housing supports a communication circuit operably coupled to receive measurement data representative of measurements performed by the at least one sensor device. The method further includes coupling the wear liner to the piece of industrial equipment. and ensuring the position of the housing between a wall of the piece of industrial equipment and a wear surface of the wear-liner. The method also includes powering on the at least one sensor device, and using a data acquisition device to acquire measurement data from the communication circuit.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

DETAILED DESCRIPTION OF THE PREFERRED EMBODIMENTS

Figure 1:
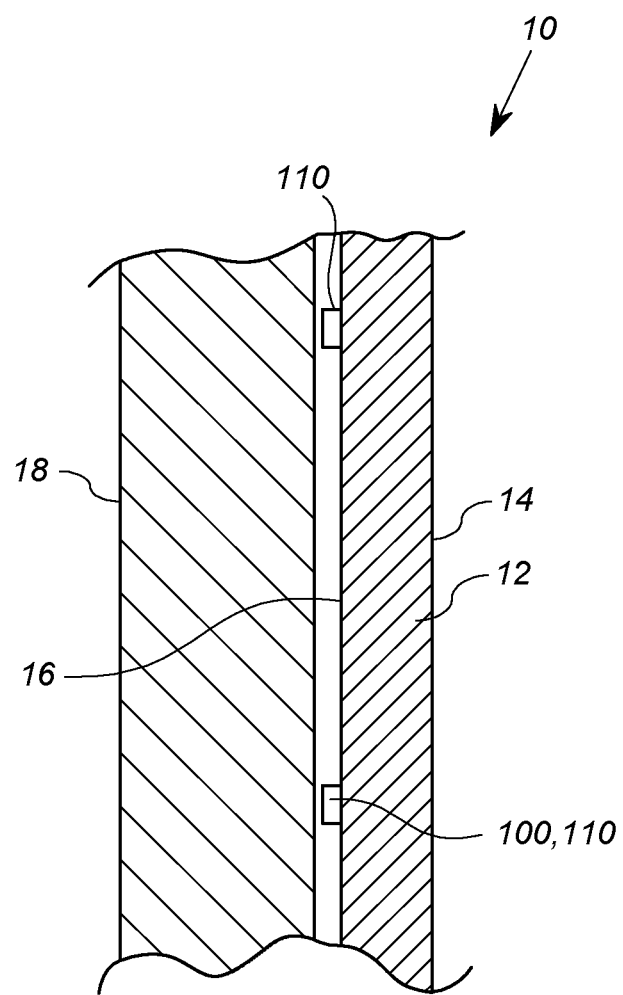
FIG. 1 shows a fragmentary cutaway view of an exemplary system according to a first embodiment attached to a wall of a piece of industrial equipment.

FIG. 1 shows a fragmentary cutaway view of an exemplary system 10 according to a first embodiment attached to a substrate 18, which is in the form of a wall of a piece of industrial equipment. The system 10 includes a plurality of sensor units 100, disposed on a wear plate or wear liner 12. The wear liner 12 includes a wear surface 14 and an opposing non-wear surface 16. The wear liner 12 is coupled to the substrate 18 such that the non-wear surface 16 is adjacent to and faces the substrate 18. The wear surface 14 is disposed to receive work material, such that the wear liner 12 operates to protect the substrate 18 from damage from work material.

As will be discussed further below in detail in connection with FIG. 3, each of the plurality of sensor units 100 includes at least one condition sensor device communicatively or electrically coupled to a power source, not shown in FIG. 1, and communicatively coupled to a data acquisition device, also not shown in FIG. 1. As will also be discussed below in detail, each of the condition sensor devices of the plurality of sensor units is physically coupled to the wear liner 12, and in one embodiment is disposed on the non-wear surface 16.

The terms "wear liner" and "wear plate" are used interchangeably throughout this specification and both reference a protective layer applied to the wear surface of industrial equipment. It should also be noted that the industrial equipment used in this specification may be exemplified by chutes, holding tanks, and other equipment including but not limited to hoppers, conveyors, jack ladder flights, and grizzly screen bars.

Figure 2:
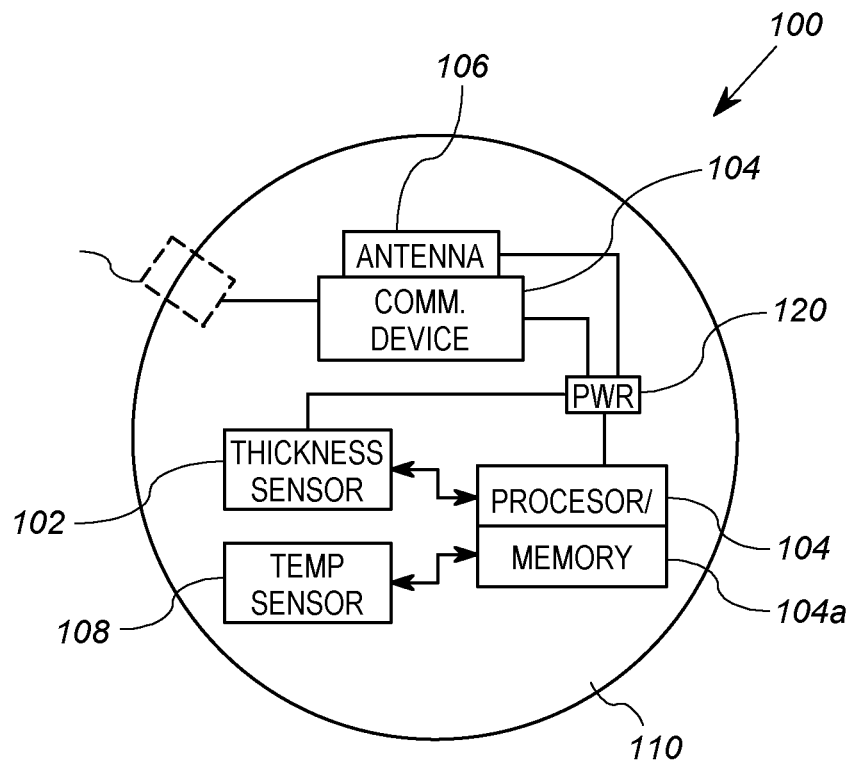
FIG. 2 shows a schematic view of an exemplary sensor unit that may be used in the system of FIG. 1

FIG. 2 shows a schematic view of an exemplary embodiment of a sensor unit 100 of the system 10 of FIG. 1. As shown in FIG. 2, the sensor unit 100 may comprise a thickness measuring sensor 102, and a communications device or circuit 104, antenna 106, a temperature sensor 108, a housing 110, a processor 114 and a memory circuit 114a.

The thickness measuring sensor 102 is a device operably connected to generate thickness information regarding the wear liner 12 when operably coupled to the wear liner 12. In this embodiment, the thickness measuring sensor is supported on or in the housing 110, and may include but is not limited to one-sided non-destructive sensing technologies such as an ultrasonic transducer, a dry contact ultrasonic sensor, or an electromagnetic transducer. In other embodiments, the thickness measuring sensor 102 may be a contact probe or other form of non-contact probe.

In this embodiment, the temperature sensor 108 is configured to generate measurements corresponding to or representative of a temperature of the wear liner 12. The temperature sensor 108 is disposed on the housing 110 and may suitably be a thermocouple, a thermometer, a thermistor, or a resistance temperature detector (RTD). It will be appreciated, however, that the other embodiments may not include the temperature sensor 108.

The communications device 104 may include a radio and antenna 106 capable of transmitting and receiving bandwidths, including but not limited to Bluetooth, Wi-Fi, RFID, cellular, or LoRa. Additionally, the communications device 104 is configured to broadcast thickness measurement data representative of the thickness information acquired by the thickness measuring sensor 102. In some embodiments, the thickness sensor device 102 does not communicate via radio waves, but rather through an extended physical data acquisition port 116 configured to extend outside of the wear liner 12 and substrate surface 18. The communications device 104 may further be configured to communicate temperature measurement data representative of the temperature information acquired by the temperature sensor 108.

Figure 3:
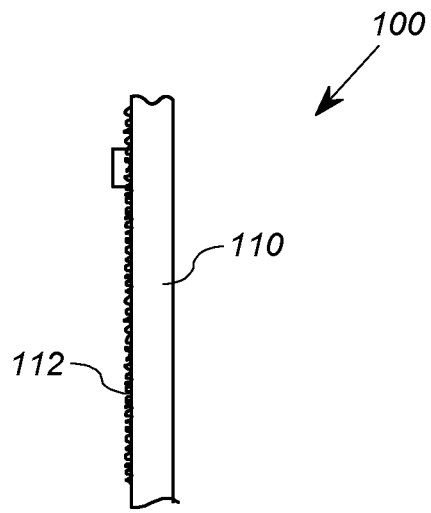
FIG. 3 shows a side plan view of the sensor unit of FIG. 2.

FIG. 3 shows a side plan view of the sensor unit 100 of FIG. 2. The housing 110 in this embodiment is a compressible housing 110 having and adhesive 112 configured to secure the sensor unit 100, and in this embodiment, the sensor device 102, to the non-wear side 16 of the wear liner 12. In other embodiments the sensor device 102 and/or sensor unit 100 may be secured to the non-wear side 16 of the wear liner by another fastening mechanism, such as a screw, bolt, magnet, hook and latch, or snap. The housing 110 has a relatively thin body that is placed between the substrate 18 and the wear liner 12, such that the sensor unit 100 is disposed at least between the wear surface 14 and the substrate 18.

In some embodiments, there is a small air gap of less than 1/32" inch between the substrate 18 and the wear liner 12 and the height of the compressed housing 110 has a similar thickness to compensate.

The adhesive 112 may be configured as a signal conduction medium between the wear liner 12 and the thickness measuring sensor 102. In the case where the thickness measuring sensor 102 is an ultrasonic transducer, sound waves in the megahertz range do not travel efficiently through air. As a consequence, a drop of coupling liquid or the adhesive 112 itself is used between the sensor 102 and the wear liner 12 in order to achieve adequate sound transmission. Common coupling fluid materials include but are not limited to glycerin, propylene glycol, water, oil, and gel. Only a small amount is needed, just enough to fill the extremely thin air gap that would otherwise exist between the sensor 102 and the wear liner 12. The coupling fluid should be selected to remain effective for the expected life of the sensor, i.e., when the wear plate 12 wears out and needs replacing.

In some embodiments, the adhesive backing 112 may be configured with a reservoir that stores and releases a coupling fluid material upon direction from the sensor processor 114. The fluid sits dormant in the capsule until the reading is required.

The processor 114 and memory 114a are supported on the housing 110. The processor 114 may suitably be one or more microprocessors, microcontrollers, logic circuit or the like programmed to carry out the operations ascribed to it herein. The processor 114 is operably coupled to receive the thickness information generated by the thickness sensor 102 and temperature information generated by the temperature sensor 108. The processor 114 is configured to store thickness measurement data based on the generated thickness information in the memory 114a. The processor 114 and memory 114a may likewise be configured to store temperature measurement data based on generated temperature information in the memory.

Figure 4:
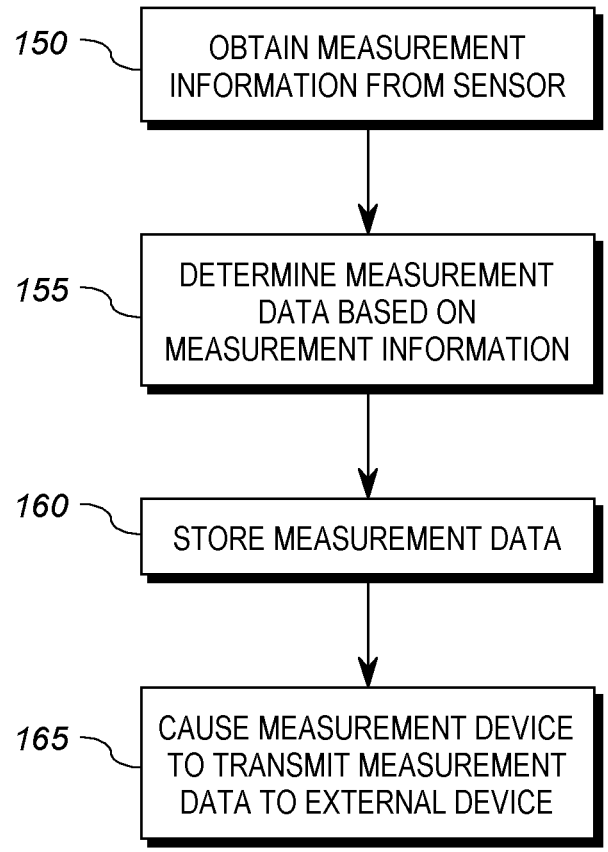
FIG. 4 shows a flow diagram of steps carried out by the processing circuit of the sensor unit of FIG. 2.

In general, FIG. 4 shows an exemplary set of operations performed by the processor 114 based on stored program instructions. In step 150, the processing circuit 114 obtain thickness measurement information from the sensor 102. To this end, in the case of the sensor 102 being an ultrasonic transducer 102, the sensor 102 transmits a sound pulse and precisely measures how long it takes for a sound pulse that has been generated to travel through wear liner 12 to the wear surface 14 and reflect to the non-wear surface 16. The reflections then travel back to the sensor 102, which converts the sound energy back into electrical energy. In essence, the sensor 102 listens for the echo from the opposite side. The processor 114 receives the information representative of the time t between transmission and echo.

Typically, this time interval is only a few microseconds. In step 155, the processor 114 determines thickness measurement data based on the time t. To this end, processor 114 is pre-programmed with the speed of sound V the material of the wear liner 12, from which it can then calculate thickness T using the simple mathematical relationship $T=(V) \times (t/2)$, described above.

In this embodiment, however, the processor 114 further calculates the thickness using the temperature information. In particular, many probes/sensors have some sensitivity to temperature changes. Varying the temperature of the probes changes the thickness measurements. The thermal specifications of the sensor 102 are used to generate an adjustment to the thickness measurement T based on the temperature information obtained from the temperature sensor 108. The adjustment is configured to ensure that changes in thickness measurement data due to thermal changes is less than the desired precision of the thickness measurement.

In any event, in step 160, the processor/memory 114 stores the thickness calculation or thickness measurement data in the memory 114a. In some embodiments, the processor 114 may store temperature data based on the temperature information from the temperature sensor 108.

In step 165, the processor 114 causes the communications device 104 to transmit the thickness measurement data to an external device, such as a data acquisition device as will be discussed below in connection with FIG. 5. In some embodiments, the processor 114 may also cause the communication device 104 to transmit the temperature data to the external device that receives the thickness measurement data. Such external device can use the temperature information to, among other things, adjust the received thickness measurement data based on the temperature data.

Referring again to FIG. 2, in one aspect of the invention, the thickness sensor unit 102 is a passivated device configured to be interrogated on powered through the reception of an interrogation signal sent by an interrogation device. In these embodiments, the interrogation signal from an external source, not shown in FIG. 2, is received by the antenna 106. The antenna 106 is operably coupled to the power source 120. The power source 120 in such an embodiment includes known circuitry for harvesting power from an RF signal. When the power source 120 reaches a minimally charged threshold, the sensor 102 is activated into a measuring mode. In some embodiments, the antenna 106 may comprise an elongated antenna configured to extend beyond the wear plate 12 (and hence beyond the housing 110), such that the elongated antenna 106 is uninhibited by the wear plate 12 or substrate plate 18 from receiving interrogation signals or sending data signals.

As illustrated in FIG. 1, the system 10 can include a plurality of the sensor units 100. FIG. 5, for example, shows an exploded perspective view of an exemplary embodiment of the system 10 having a substantially square substrate 18 and corresponding square wear liner 12. It will be appreciated that the substrate 18 may alternatively take any common shape of a wall or substrate of industrial equipment that would be exposed to abrasive media contact without a wear liner. The use of the square substrate 18 is for purposes of clarity of exposition and is in no way limiting.

Figure 5:
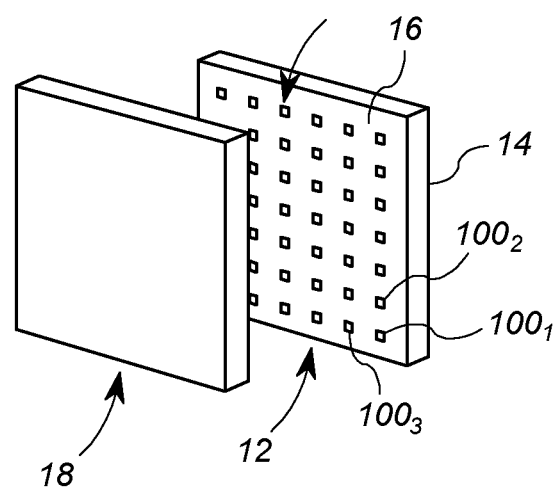
FIG. 5 shows an exploded representative perspective of the system of FIG. 1.
Figure 6:
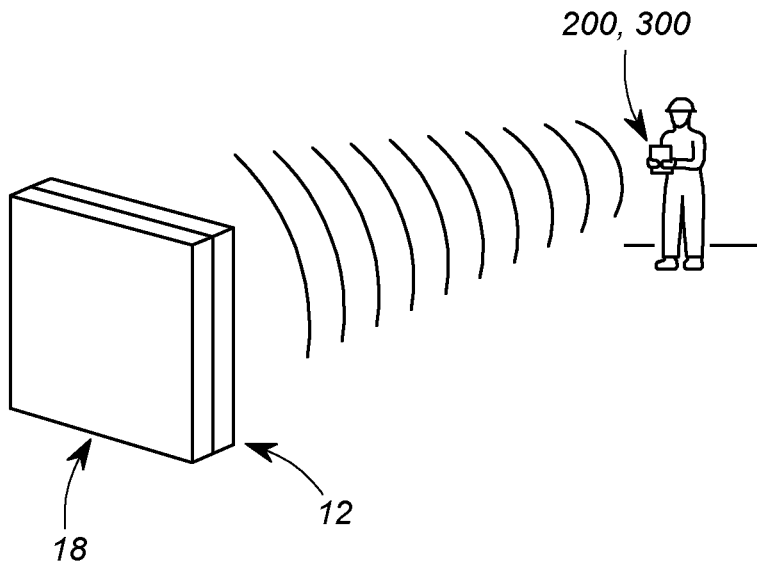
FIG. 6 shows a representative perspective view of the system of FIG. 1 providing data to a remote device.

FIG. 6 shows a perspective view of the system 10 of FIGS. 1 and 5, used in connection with a technician gathering measurement data from one or more of the plurality of sensor units 100. When the processor 114 of one or more sensor units 100 performs step 165 of FIG. 4, the technician obtains measurements in this embodiment on a data acquisition device 200, which may suitably be on include a portable computer, tablet device, or cell phone. In some embodiments, the data acquisition 200 device may comprise an operating system and graphical user interface ("GUI") configured to either receive the raw sensor data and convert the sensor data into a thickness reading, or receive the thickness reading already processed by the sensor device and directly convey the process thickness value to the end user through the GUI. The data acquisition device in other embodiments can include a backend cloud server.

As shown in FIG. 6, the plurality of sensor units 100 are aligned in a predefined pattern on the non-wear side 16 of the wear plate 12. In alternative embodiments, a pattern may not be necessary. In this configuration, the sensor units 100 may all individually broadcast thickness measurement data through individual antennas (e.g. antenna 114a of FIG. 2), or the sensor units 100 may be electrically or communicatively coupled to form a network. In the networked configuration, the electrically coupled sensor units 100 may share a single antenna to receive interrogation signals or send out unique data signals identifying the thickness in the particular area.

In communicatively coupled sensor units 100, the units 100 may link together through their individual antennas to form a mesh network or peer-to-peer network. In this aspect, a first sensor unit $100_1$ would receive an interrogation signal, and rebroadcast that signal to nearby devices $100_2$, $100_3$, which would in turn rebroadcast as well. Once the array of sensor units 100 has been interrogated, each sensor unit 100 can broadcast to the next closest sensor, until the signal reaches the sensor unit coupled to an antenna capable of broadcasting to the data acquisition device 200.

Figure 7:
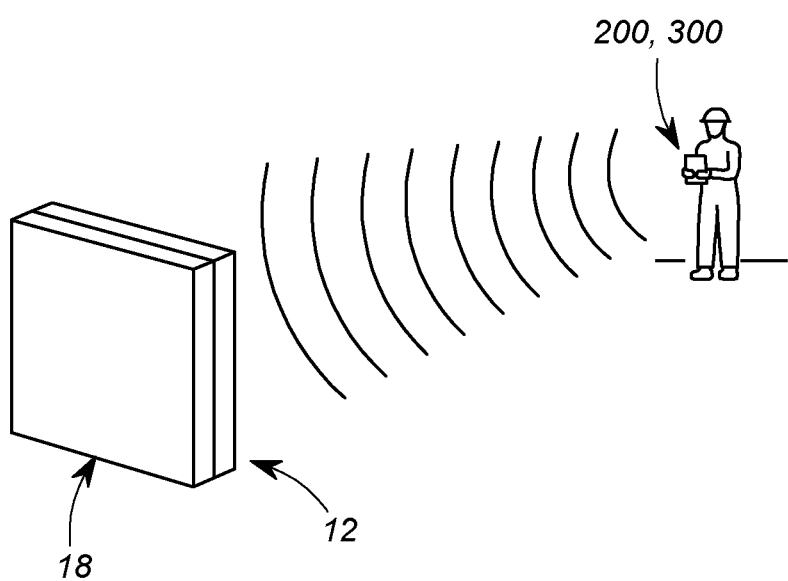
FIG. 7 shows a representative perspective view of the system of FIG. 1 providing RF signals to power the sensor units of the system of FIG. 1.

As discussed above, the thickness sensor units 100 in one embodiment can be passivated devices configured to be interrogated or powered through the reception of an interrogation signal sent by an interrogation device. FIG. 7 shows the system 10 configured for operation of the sensor units 100 as passivated devices. The interrogation device may be the data acquisition device 200 or a separate device 300 configured to transmit the interrogation signal 302. In these embodiments, the interrogation signal 302 is sent and received by the thickness sensor unit antenna 106. The power source 120 converts the RF energy in the interrogation signal 302 to electrical power for use by the components of the sensor unit 100. When the power source 120 reaches a minimally charged threshold, the sensor unit 100 is activated and performs the measurements. The sensor unit 100 then conveys the information wirelessly to the data acquisition device 200.

The data acquisition device 200 in this embodiment includes an operating system and graphical user interface configured to receive the measurement data, which may be raw sensor measurement information, the calculated thickness data already processed by the sensor device processor 114. The data acquisition device 200 can directly convey the thickness measurement data to the end user through the GUI. The GUI may be configured to send and receive alerts when areas of the wear liner 12 meet a preconfigured threshold thickness, or experience temperature abnormalities. The GUI or backend server may be communicatively coupled with the industrial equipment and may shut the piece of equipment down if a threshold thickness is met.

Figure 8:
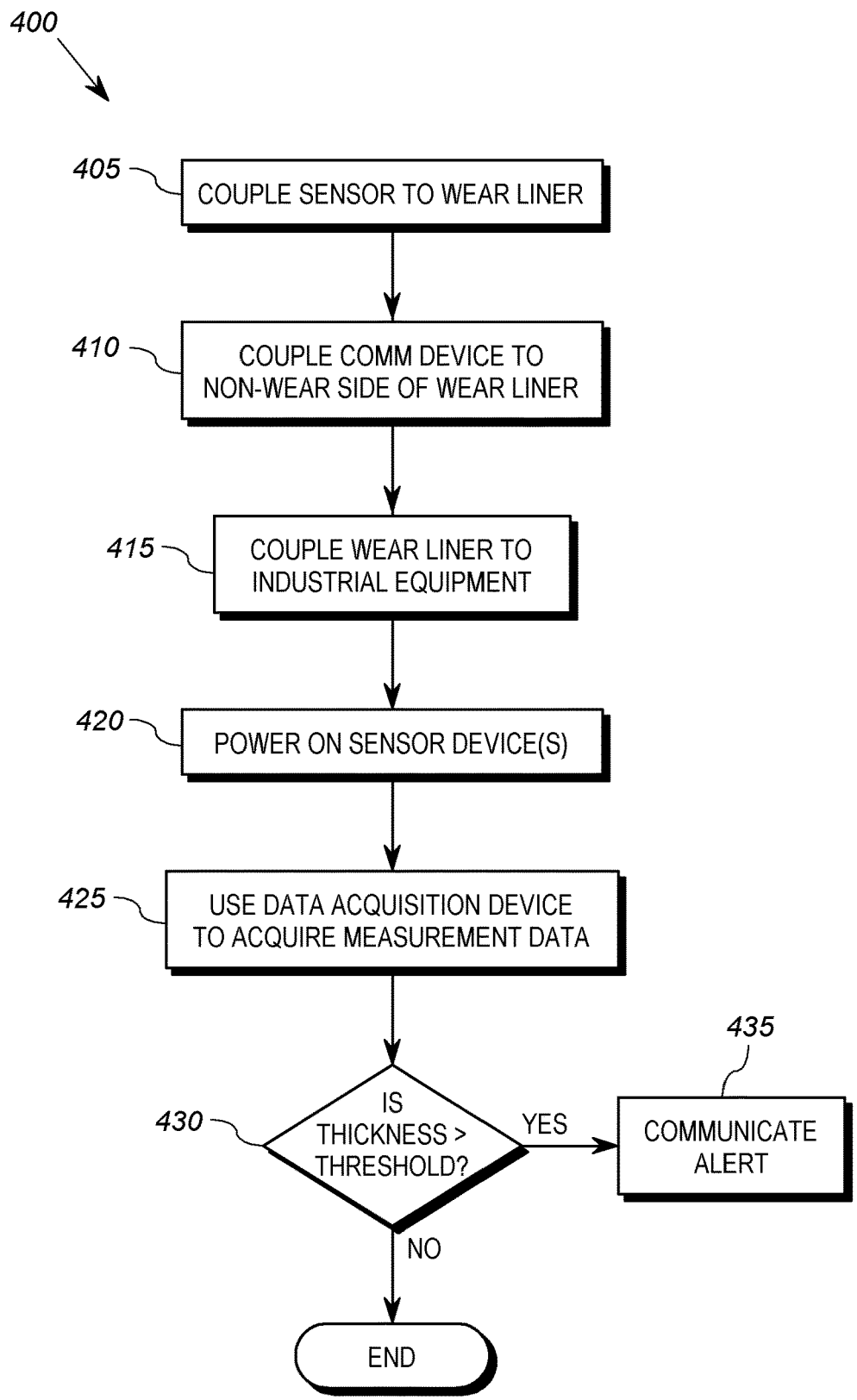
FIG. 8 shows a flow diagram of an exemplary method of obtaining measurements of a wall or wear plate.

FIG. 8 shows a method 400 that may be carried out by the system 10 of FIG. 1. It will be appreciated that the method 400 may be carried out by many variants of the system and other systems. In step 405, at least one sensor device is coupled to a wear liner 12. In the embodiment of FIGS. 2, 5 and 6, the sensor units 100, which include the sensor devices 102, are affixed to the wear liner 12.

Step 410 comprises physically coupling a housing that includes a communication circuit to a non-wear side 16 of a wear liner 12. The communication circuit is operably coupled to receive measurement data representative of measurements performed by the at least one sensor device. In the embodiment of FIGS. 2, 5, and 6, steps 405 and 410 both occur when the housing 110, which includes the communications device 104, is coupled to the non-wear side 16 of the wear-liner 12. The communication circuit 104 is operably coupled to receive measurement data through the processor 114.

In step 415, the wear liner 12 is coupled to a piece of industrial equipment, for example, to protect the industrial equipment from moving material that could damage the equipment. The wear liner 12 is coupled to ensure the position of the housing between a wall of the piece of industrial equipment and a wear surface of the wear-liner. In the example of FIGS. 2, 5 and 6, the housing 110 is positioned between the wear surface 14 of the wear liner 12 and the substrate 18.

In step 420, the at least one sensor device is powered on, and generates measurement information. In step 425, a data acquisition device is used to acquire measurement data from the communication circuit. In the exemplary embodiment of FIGS. 2, 5 and 6, the data acquisition device 200 acquires measurement data transmitted by the communication circuits 104 of the sensor units 100.

In some embodiments, the method 400 may include (step 430) comparing the thickness measurement data (or other measurement value) to one or more stored threshold values. If the comparison indicates that the measurement data exceeds one or more thresholds, then an alert is communicated to another device or remote user in step 435. The alert could indicate to users of the system to the need to change the wear liner 12 before damage is done to the industrial equipment substrate 18. In some embodiments, step 435 could include electrically and or mechanically shutting down the industrial equipment, via a remotely actuatable safety (i.e. power cutoff) switch, when the threshold is met before further damage can be done to the equipment. In the embodiment of FIGS. 2, 5 and 7, steps 430 and 435 could be carried out by one or more of the processing circuits 114 of the sensor units 100, by the data acquisition device 200, or a combination of both.

It will be appreciated that the above-describe embodiments are merely illustrative, and that those of ordinary skill in the may readily device their own implementations and modifications that incorporate the principles of the present invention and fall within the spirit and scope thereof.

The invention claimed is:

1. A system for monitoring a wear plate condition within industrial equipment, comprising:
   a. at least one ultrasonic sensor device coupled to a non-wear side of the wear plate, the non-wear side of the wear plate configured to be mounted to a wall of the industrial equipment;
   b. the at least one sensor device communicatively or electrically coupled to a power source; and
   c. the at least one sensor device communicatively or electrically coupled to a data acquisition device,
   wherein the non-wear side of the wear plate is configured to be mounted to the substrate of the industrial equipment while the at least one sensor device is coupled to the non-wear side of the wear plate.

2. The system according to claim 1, further comprising a housing supporting the sensor device and the power source, the housing disposed adjacent the substrate and adjacent the non-wear side of the wear plate.

3. The system of claim 2, wherein the housing comprises a compressible housing having a similar fastening mechanism configured to secure the sensor device to the non-wear side of the wear plate.

4. The system according to claim 2, further comprising a signal conduction medium between the wear liner and the at least one sensor device.

5. The system according to claim 3, where the at least one ultrasonic sensor device is a thickness sensor device.

6. The system according to claim 1, further comprising a processing circuit and a memory supported on the housing, the processing circuit configured to:
   obtain thickness measurement information from the at least one sensor and store the thickness data representative of the thickness measurement information in the memory; and
   cause communication of the thickness data to the data acquisition device.

7. The system according to claim 6, further comprising a temperature sensor supported on the housing, the temperature sensor operably coupled to provide temperature measurement information to the processing circuit.

8. The system according to claim 7, wherein the processing circuit is further configured to generate the thickness data based on the thickness measurement information and the temperature measurement information.

9. The system according to claim 1, wherein the at least one sensor device comprises a plurality of individual sensors electrically or communicatively coupled to form a network.

10. A method for measuring the thickness of a wear plate in a piece of industrial equipment, comprising:
- a. coupling at least one ultrasonic sensor device to a wear plate;
- b. physically coupling a housing to a non-wear side of the wear plate, the housing supporting a communication circuit operably coupled to receive measurement data representative of measurements performed by the at least one sensor device;
- c. mounting the wear plate to a surface of a wall of the piece of industrial equipment;
- d. ensuring the position of the housing between the surface of the wall of the piece of industrial equipment and a wear surface of the wear-liner;
- e. powering on the at least one sensor device; and
- f. using a data acquisition device to acquire measurement data from the communication circuit.

11. The method according to claim 10, wherein the housing further supports a processing circuit and further comprising using the processing circuit to generate the measurement data based on measurement information received from the at least one sensor.

12. The method of claim 11, wherein the at least one sensor device comprises a thickness measurement sensor, and the measurement data comprises thickness measurement data, and further comprising comparing the thickness measurement data to at least one thickness threshold.

13. The method according to claim 12, further comprising alerting a system or a user of the system that the threshold thickness measurement responsive to a determination that the thickness measurement data has exceeded the at least one thickness threshold.

14. A system for monitoring a wear plate wall condition within industrial equipment, comprising:
- a. a wear plate wall having a wear surface and a non-wear side opposite the wear surface, the opposite surface configured to be mounted to a substrate of the industrial equipment;
- b. at least a first measuring sensor, wherein the first measuring sensor is an ultrasonic sensor, operably coupled to generate measurement information representative of a wear plate wall condition;
- c. a wireless communications device coupled to the wear plate wall such that the wireless communications device is disposed exterior to the substrate and between the wear surface and the substrate when the opposite surface is disposed adjacent to the substrate, the wireless communication device configured to communicate wireless signals having data representative of the generated measurement information to a data acquisition device;
- d. a power source coupled to the wear plate wall and operably coupled to provide electrical power to the wireless communication device.

15. The system of claim 14, wherein the first measuring sensor comprises a thickness sensor configured to generate the measurement information wherein the measurement information is representative of a wear plate thickness.

16. The system of claim 15, further comprising a second measuring sensor operably coupled to generate second measurement information representative of a temperature, and wherein the thickness sensor is further configured to adjust the measurement information representative of the wear plate thickness based on the second measurement information.

17. The system of claim 16, wherein the second measuring sensor is disposed between the wear surface and the substrate when the opposite surface is disposed adjacent to the substrate.

18. The system of claim 17, further comprising an antenna operably coupled to the wireless communication circuit, at least a portion of the antenna extending disposed external to a space defined between the wear plate and the substrate.

19. The system of claim 18, wherein the first measuring sensor is disposed between the wear surface and the substrate when the opposite surface is disposed adjacent to the substrate.

* * * * *

UNITED STATES PATENT AND TRADEMARK OFFICE
CERTIFICATE OF CORRECTION

| | | |
|---|---|---|
| PATENT NO. | : 11,879,723 B2 | Page 1 of 1 |
| APPLICATION NO. | : 16/964184 | |
| DATED | : January 23, 2024 | |
| INVENTOR(S) | : Jenkins et al. | |

It is certified that error appears in the above-identified patent and that said Letters Patent is hereby corrected as shown below:

In the Specification

Column 5, Line 40, "the speed of sound V the material" should read --the speed of sound V in the material--.

In the Claims

In Claim 1:
At Column 8, Line 30, "a data acquisition device," should read --a data acquisition device.--; and Column 8, Lines 31-34, should be deleted.

Signed and Sealed this
Eleventh Day of March, 2025

Coke Morgan Stewart
*Acting Director of the United States Patent and Trademark Office*